C. O. HATHAWAY & F. W. HUFFAKER.
SICKLE SHARPENER.
APPLICATION FILED JULY 12, 1911.
1,018,051.
Patented Feb. 20, 1912.
3 SHEETS—SHEET 1.
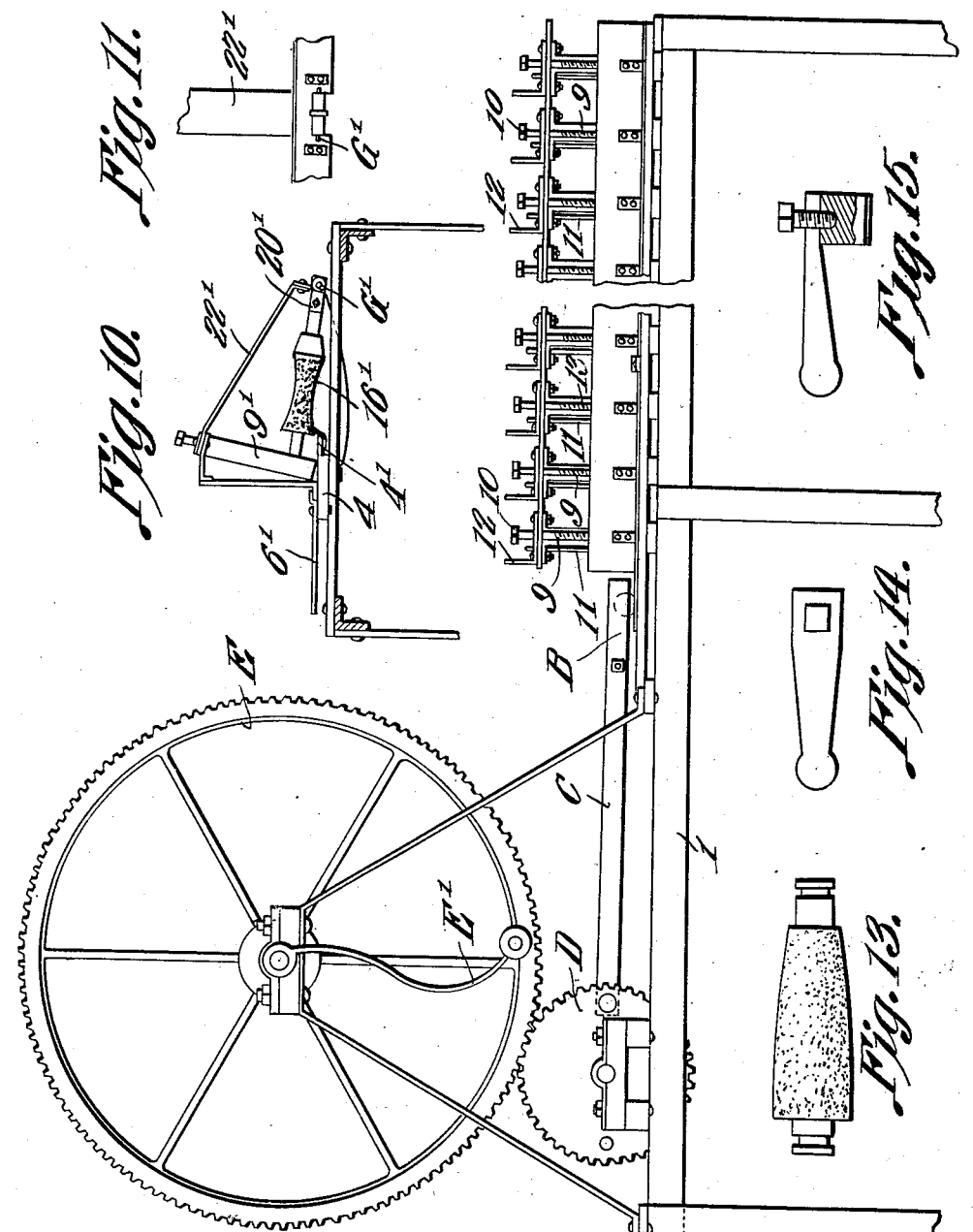
Charles O. Hathaway,
Francis W. Huffaker,
Inventors
Witnesses
by C. A. Snow & Co.
Attorneys

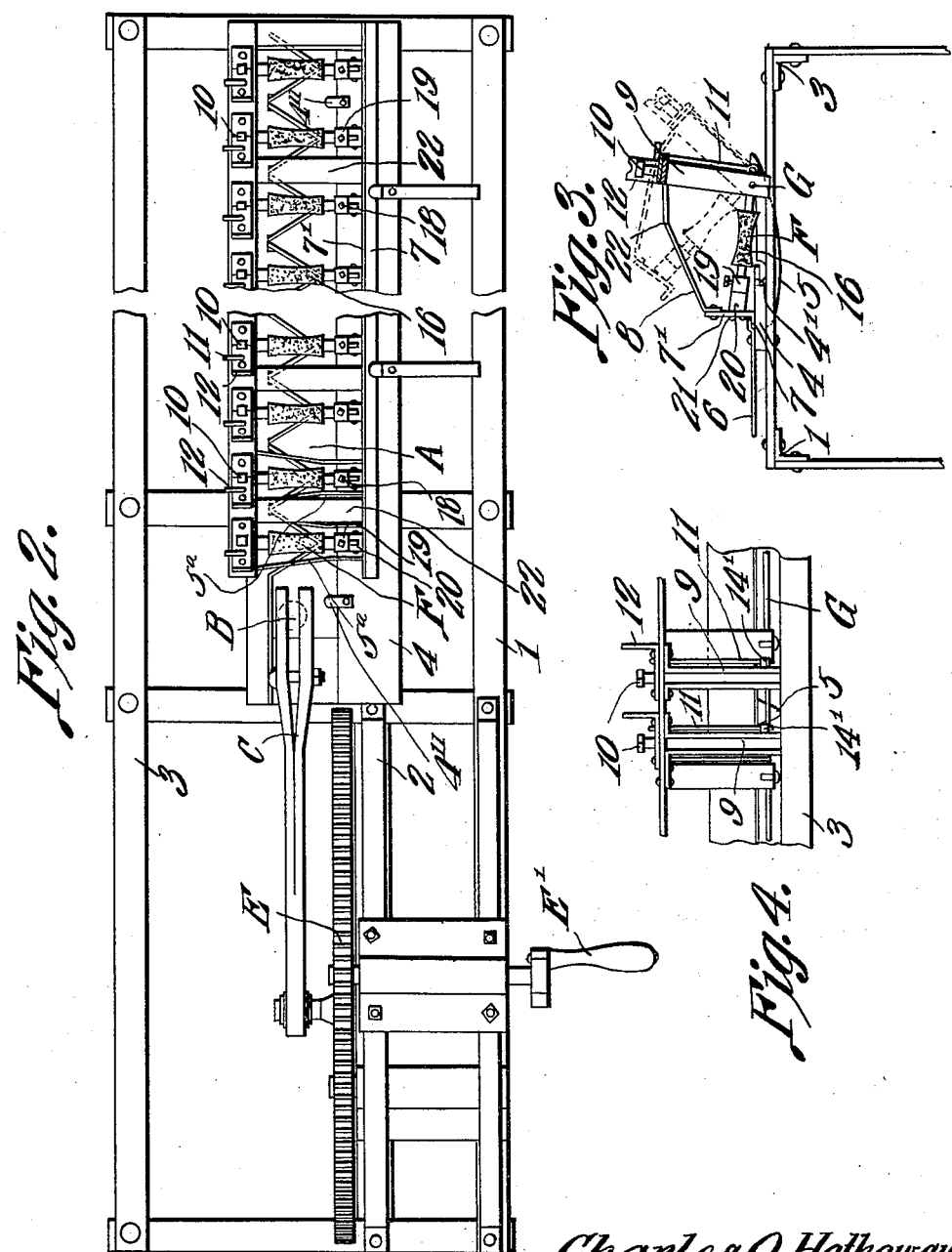

C. O. HATHAWAY & F. W. HUFFAKER.
SICKLE SHARPENER.
APPLICATION FILED JULY 12, 1911.
1,018,051.
Patented Feb. 20, 1912.
3 SHEETS—SHEET 3.
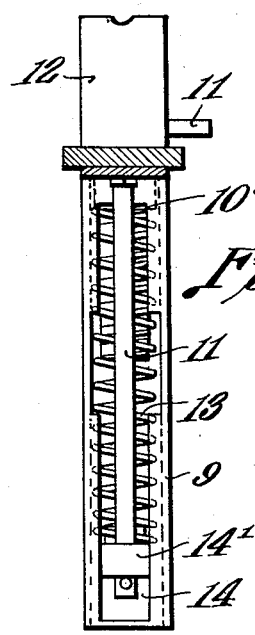
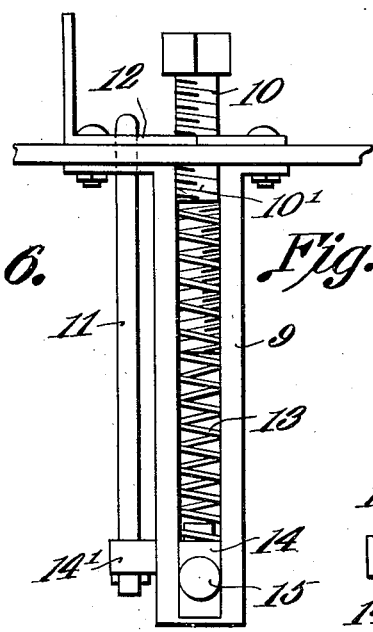
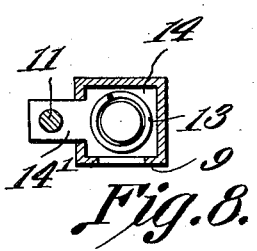
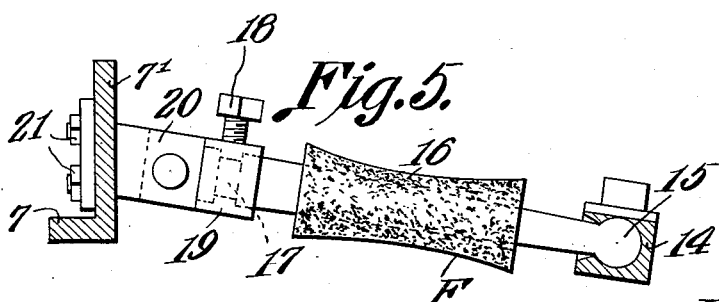
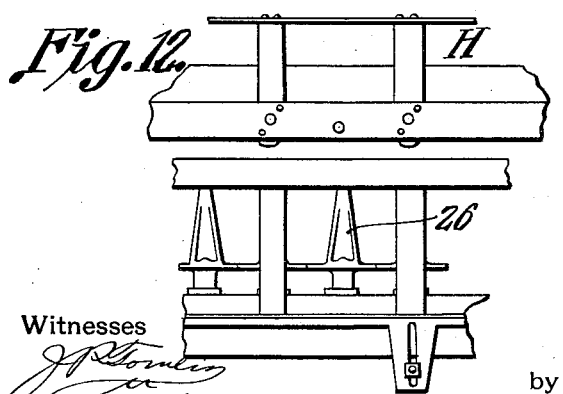
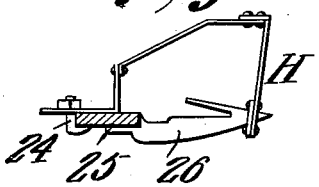
Charles O. Hathaway,
Francis W. Huffaker,
Inventors
Witnesses
by
Attorneys

UNITED STATES PATENT OFFICE.

CHARLES O. HATHAWAY AND FRANCIS WM. HUFFAKER, OF BIG TIMBER, MONTANA.

SICKLE-SHARPENER.

1,018,051. Specification of Letters Patent. Patented Feb. 20, 1912.

Application filed July 12, 1911. Serial No. 638,168.

*To all whom it may concern:*

Be it known that we, CHARLES O. HATHAWAY and FRANCIS W. HUFFAKER, citizens of the United States, residing at Big Timber, in the county of Sweet Grass, State of Montana, have invented a new and useful Sickle-Sharpener, of which the following is a specification.

This invention relates to an improvement in sickle sharpeners, the primary object of the invention being the provision of a sharpening device, which can be attached to a mowing machine, to sharpen the blades while the mower is being used or whereby the blade may be removed from the machine and sharpened, it being necessary in sharpening said blades, to secure the reciprocatory movement obtained while mowing.

A further object of the present invention is the provision of a self-adjusting spring held sharpening means for each blade so positioned as to sharpen one edge of its respective blade as the blade is moved in one direction and to sharpen the other edge of the same blade when the blade is returned in the opposite direction.

A still further object of the present invention is provision of a series of individual sharpening devices of peculiar shape to engage the full cutting edges of their respective blades, and to whet or sharpen them by the movement of the blades in the two directions, as when being operated for mowing, combined with a means for actuating the cutter blades to accomplish this action.

With the foregoing and other objects in view which will appear as the description proceeds. the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a side elevation of the complete device for sharpening detached blades. Fig. 2 is a top plan view thereof, the central portion being broken away to shorten the machine the same as in Fig. 1. Fig. 3 is a detail side elevation of one of the sharpeners, dotted lines illustrating the swinging movement of the same away from the base and blade. Fig. 4 is a rear view of a number of the sharpeners. Fig. 5 is an enlarged detail view of the sharpener, showing its mountings at each end. Figs. 6, 7 and 8 are detail views of the spring actuated end of the sharpener. Fig. 9 is a detail sectional view through the moving knife support of a mowing machine adjacent to the sharpeners. Fig. 10 is a side elevation of a modified form of sharpener. Fig. 11 is an end view thereof. Fig. 12 is a top plan view showing the sharpener attached to the cutter bar of a mowing machine. Figs. 13, 14 and 15 are detail views of the sharpener and its connections, as used next to the sickle head.

Referring to the drawings, A designates the mowing or cutter blade, B its knob attaching device of usual construction, C a split clamping arm, D a small pinion for transmitting a reciprocating movement to the arm and blade, and E the main power gear, operated by hand through the crank E'. The main frame or table comprises the parallel strips 1, 2 and 3, which support the blade A, so that it may be reciprocated, the plate 4 with its lip 4', with the strip 4'', forming a guide or receptacle for said blade A. The braces 5ª, are employed to stop the jar next to the sickle head. As all of the sharpeners F are arranged in multiple, a description of one will suffice for all, they all being pivotally mounted upon the longitudinal rod G, and are held in locked position by means of the clamps 6, which engage the lip or flange 7, of the upright longitudinal plate 7'. Carried by the strip at the underside thereof and arranged similar to the guard-fingers of a mower, are the guard-fingers 5, which act with the blades of the cutter in assisting the whetting action of the sharpeners 16, as will presently appear. Pivoted upon the rods G, is the frame 9, of each sharpener, this frame having mounted therein the coiled spring 13, which normally exerts a tension downwardly upon the block 14, which has swivelly mounted therein the round head 15, of the sharpener 16, the lug 14', being connected upon the hooked rod 11, whose hook passes over the top of frame 9, and engages the right-angled plate 12, the set-screw 10, regulating the tension of the spring 13, within the frame 9. The other end of the shaft that carries the sharpener 16, is recessed as at 17, and is held against longitudinal movement within the sleeve 19, by the set-screw 18, the said sleeve 19, being swivelly connected to the lug 20, held to the plate 7', by means of nuts 21. By this construction, and the peculiar concaved contour of the spool-shaped sharpeners 16, it will be seen that these sharpeners, which are one to each blade of the cutter bar, will act upon the two cutting edges of the said blades, as the bar is reciprocated, and that by reason of the spring 13, the sharpeners are yieldingly and cushionedly held toward the blade, and will adjust itself to the irregularities thereof, occasioned by the angle of the cutting edges or the thickness of the body of the blade.

By reference to Figs. 10 and 11, it will be seen that a convex sharpener 16', may be used, in which case, the lugs 20', are pivoted to the rods G', the bracing frame 22, is also supported from said lugs 20', and the frames 9', which are similar to the frame 9, heretofore described, are identical, except that their position is reversed, and are held fast by means of clamps 6', to the top of the table. By this means the front end of the sharpeners 16', will rise and fall, and not the rear ends as in the other case.

As shown in Figs. 9 and 12, the sharpeners, are mounted for use upon a mowing machine, and when so mounted the sharpener supporting frame H, is connected by clamps 24 to the cutter bar 25, of the mower, while the guard-fingers 26 are engaged by the other ends of the frames H. By this means the sharpeners 16 or 16', may be mounted in operable relation to the blades of the mower, so that when the mower is operated in the usual manner, the reciprocation or oscillation of the blades will cause the sharpeners to act thereon and sharpen the blades without removing said blades from the machine.

The sharpeners 16 and 16' may be made in the form of steel files, or may be made of stone, carborundum, or in fact any desirable whetting or abrasive material that will satisfactorily sharpen the cutter blades.

It is evident that a sickle sharpener is provided that will insure the sharpening of both edges of each individual blade of a cutter-bar of a mower, while either in the machine or out.

What is claimed, is:—

1. The combination with a support, and means for oscillating a mowing machine knife in said support mounted for oscillation thereon, and means for oscillating said knife, of a frame pivoted to the support and adapted to rest above the knife, a series of guides carried by the frame, one opposed to each blade of the knife, and a spring actuated blade sharpener carried by the frame and mounted in each guide.

2. The combination with a support, and means for oscillating a mowing machine knife in said support mounted for oscillation thereon, and means for oscillating said knife, of a frame pivoted to the support and adapted to straddle the knife, a series of guides carried at one side of the frame, a spring mounted in each guide, and a blade sharpener pivotally mounted in the frame and having its free end cushionedly engaged by said spring in the guide.

3. The combination with a support, and means for oscillating a mowing machine knife in said support mounted for oscillating thereon, and means for oscillating said knife, of a frame swingingly mounted to the support with relation to the knife, means for locking the same in operable relation to the knife, and a plurality of spring tensioned blade sharpeners, one to each blade of the knife, mounted in the frame.

4. The combination with a support, and means for oscillating a mowing machine knife thereon, of a frame pivoted to the support and adapted to rest above the knife, a series of guides carried by the frame, one opposed to each blade of the knife, and a rotatably mounted and spring actuated blade sharpener carried by the frame and mounted beneath the guide.

5. The combination with a support, and means for oscillating a mowing machine knife thereon, of a frame pivoted to the support and adapted to straddle the knife, a series of guides carried at one side of the frame, a spring mounted in each guide, and a rotatable blade sharpener mounted to swing longitudinally in the frame and have its free end cushionedly engaged by said spring in the guide.

6. The combination with a support, and means for oscillating a mowing machine knife, mounted for oscillating thereon, of a frame swingingly mounted to the support with relation to the knife, means for locking the same in operable relation to the knife, and a plurality of rotatably mounted and spring tensioned blade sharpeners, one to each blade of the knife, mounted in the frame.

In testimony that we claim the foregoing as our own, we have hereto affixed our signatures in the presence of two witnesses.

CHARLES O. HATHAWAY.
FRANCIS WM. HUFFAKER.

Witnesses:
A. N. HAID,
C. N. SKILLMAN.

Copies of this patent may be obtained for five cents each, by addressing the "Commissioner of Patents, Washington, D. C."